United States Patent [19]
Gillis

[11] 3,955,289
[45] May 11, 1976

[54] EDUCATIONAL AND DISPLAY APPARATUS

[75] Inventor: Clifford J. Gillis, Winthrop, Mass.

[73] Assignee: Alfred B. Ramage, Alston, Mass. ; a part interest

[22] Filed: Jan. 3, 1975

[21] Appl. No.: 538,331

[52] U.S. Cl. ............................. 35/8 R; 273/130 R
[51] Int. Cl.² ...................................... G09B 19/22
[58] Field of Search...... 273/130 R, 131 AB, 131 R; 35/7 R, 7 A, 8 R, 21, 24 R, 24 A, 24 B, 54; 283/1 A

[56] References Cited
UNITED STATES PATENTS

| | | |
|---|---|---|
| 1,532,069 | 3/1925 | Ortiz et al. ........................ 35/8 R X |
| 3,254,893 | 6/1966 | Serviere ........................ 273/131 AB |

OTHER PUBLICATIONS

*The Complete Chess Course* by Fred Reinfeld, 1953–1959, Hanover House, Publishers, Title and Next Page, pp.42, 43.

*Primary Examiner*—Wm. H. Grieb

[57] ABSTRACT

Educational and display apparatus which comprises indicia representative of multiple entities and means associated with said indicia which depicts the events which each of the entities experiences, the sequence in which said events are experienced, and the interactions between said entities.

10 Claims, 3 Drawing Figures

EDUCATIONAL AND DISPLAY APPARATUS

BACKGROUND OF THE INVENTION

Methods and apparatus for teaching have made significant advances over the past generation but until the instant invention there was no way to concisely display, as an educational and informational tool, the relationship of various entities, each to the other, sequence of events experienced by the entities, and their interactions, in a single, generally planar apparatus which does not require reference to textual material to perceive the substance of the display. In particular the present invention relates to apparatus for teaching and displaying various techniques and strategies for playing games of skill, such as chess, checkers, etc., in which each player begins with a predetermined number of pieces arranged in a predetermined configuration. The order and movement of each piece is determined by the players, in sequence.

More particularly, the invention relates to educational and display apparatus for teaching and describing the game of chess, a popular game of international recognition in which each of two players are permitted sixteen pieces, including eight pawns, two rooks, two knights, two bishops, a queen and a king, each of which may be moved in a uniquely restrictive fashion. The game is played on a board consisting of sixty-four squares and its objective is for one player to capture the king of the other player.

Generally, the moves of a game of chess are defined in standard notation which gives the name of the piece moved and coordinates of the square to which it is moved. For example, P-K3 would indicate that a pawn has been moved to the third rank in the file whose first rank was originally occupied by the king. Often this notation accompanies drawings of a chess board on which are depicted the chess pieces in their positions after a particular move - though the sequence of events which resulted in the pieces being in that position is not shown and can only be appreciated by reading the accompanying notation.

Summary of the Invention

The present invention is directed toward an educational and display apparatus by which past events are disclosed in sequence of occurrence and resultant relationships between involved entities are presented. In particular, the present invention is directed toward apparatus for teaching games of skill in which pieces may be moved at the direction of a player to achieve the objectives of the game, and for displaying a completed game or portions thereof. More particularly, this invention is directed toward apparatus for teaching and displaying the game of chess, though it may well be employed to teach and display other games, such as checkers, etc. It will be evident that it may be used to teach and display any appropriate past sequence of events. For the sake of simplicity, the invention will hereinafter be described with respect to the game of chess, the preferred embodiment.

Objects of the Invention

It is a primary object of the present invention to provide an apparatus comprising a stratum on which indicia representative of multiple entities are located, said apparatus including means associated with said indicia which depicts the events and sequence of events experienced by said entities and the interactions between said entities.

It is another object of this invention to provide an educational and display apparatus which depicts an array of entities whereby a viewer is taught the sequence of events which resulted in the depicted array.

It is another object of the present invention to provide an apparatus to teach and display the game of chess whereby the sequence of moves made to provide a given position is depicted and pieces which have been captured are not eliminated from the apparatus so that a viewer would be aware of the tactics, strategy and sequence of moves without reference to external notation.

The invention accordingly comprises the apparatus possessing the features, properties and relation of elements which are exmplified in the following detailed disclosure, the scope of which will be indicated in the claims.

BRIEF DESCRIPTION OF THE DRAWINGS

For a fuller understanding of the nature and objects of the invention, reference should be had to the following detailed description taken in conjunction with the accompanying drawings wherein.

DETAILED DESCRIPTION OF THE INVENTION

Figure 1:
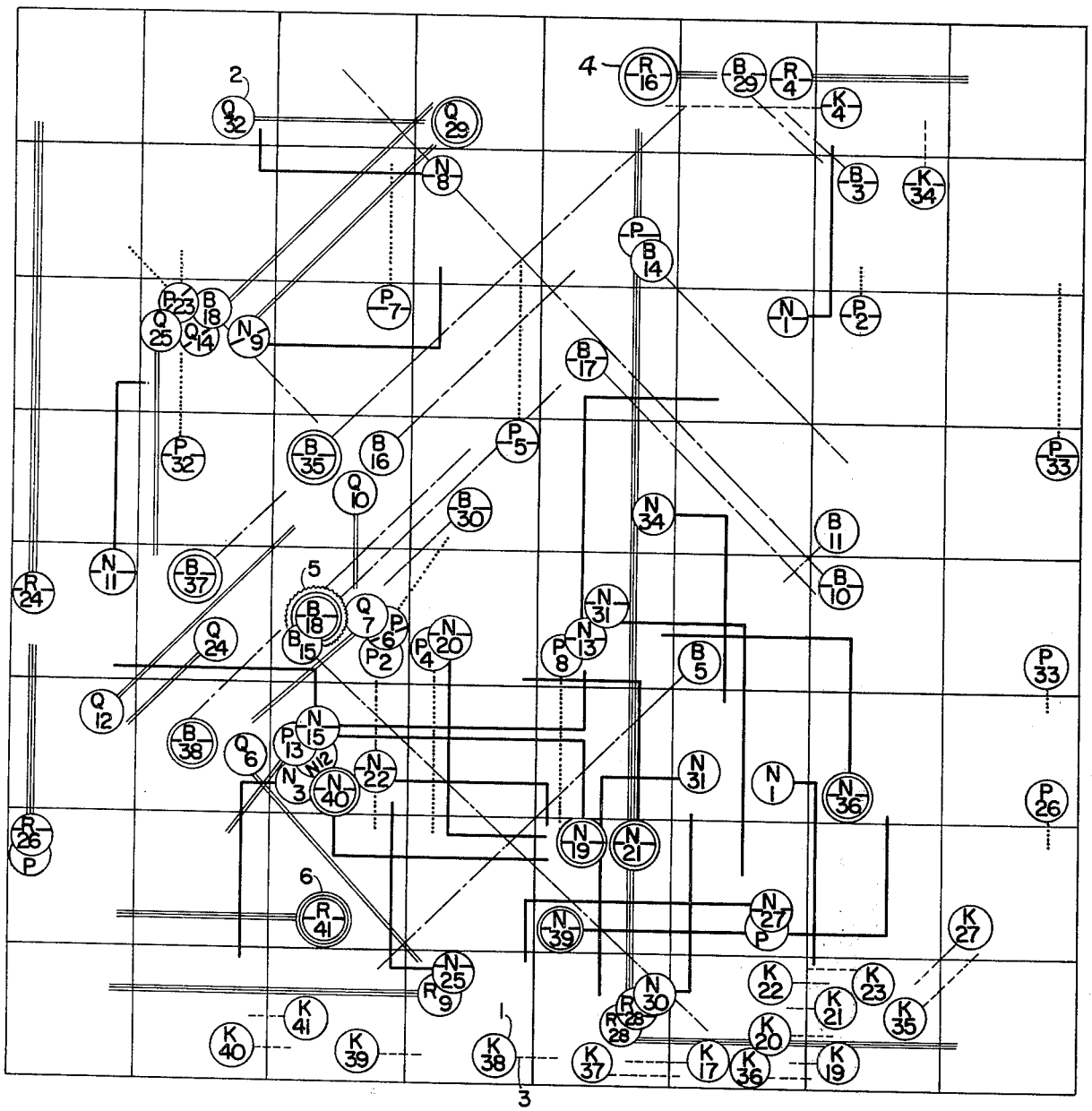
FIG. 1 is a view of the preferred embodiment of the present invention and teaches the entire Byrnes v. Fisher chess game played in New York in 1956.

The apparatus of the present invention essentially comprises a stratum, which is preferably planar, though, for aesthetic purposes it may be somewhat three-dimensional, and indicia associated with said stratum which represent the pieces of a chess set; namely, eight white pawns, two white rooks, two white knights, two white bishops, a white queen, a white king and a like member and array of black pieces. The indicia have associated therewith means which depicts the sequence of moves an individual piece has made and its interaction with other pieces. Since the array of pieces on the game board at the start of each game is always the same, it will generally not be shown; piece representations preferably being limited to the pieces which have been moved during the game or, if not moved, captured by an opposing piece.

The sequence of moves of pieces of each player will be defined by the number of the move associated with the indicia representative of the piece moved. The piece itself (king, queen, etc.) may be defined by appropriately coloring or shaping the indicia representative of the piece, though preferably it will be defined by associating the initial of the piece with the indicia which represents it. For example, K would indicate a king, N a knight, Q a queen, etc. For disply or aesthetic purposes, the indicia may be in the form of the piece it represents or other arbitrary forms which may be selected for their aesthetic or artistic values.

Another technique for indicating the piece being moved is to distinctly key the track of the piece. For example, the movement of a pawn might be represented by a solid line while that of a bishop might be represented by a double solid line, etc. Apparatus employing this means of piece identification is particularly useful in instructing beginners who will be able to immediately appreciate which pieces have been moved, where they have been moved to and the sequence in which they have been moved without reference to external notation.

The apparatus of the present invention as adapted for use in instructing more advanced players may identify the number of the move by an appropriate denotation on the depicted track of each piece as, for example, by shading, a change in color or hue, etc., the piece being identified by its track and original position. Accordingly, there need be no alphabetical or digital denotation associated with the symbol which represents the piece.

In another embodiment of the present invention for use with advanced players, the track of movement of the pieces may be eliminated and the move number and piece identification may be indicated in, for example, digital and alphabetical form associated with the indicia which represents the pieces.

Ordinarily a game of chess is divided into three segments; opening, middle and end games. During the opening segment, the pieces are taken from their original positions and arranged, move by move, according to the desires of each of the players, to assume suitable offensive and/or defensive postures. These postures are further developed during the middle game and result in a win for one player or a draw in the end game. At the option of the operator displaying the apparatus, these defined portions of the game may be depicted by, for example, causing a change in the shape of the pieces, the color or hue of the pieces, etc. An indication that a king is in danger of being captured, known as a check, may be made by, for example, placing a circle about the checking piece. A check mate, that is a position where a king cannot avoid capture, may be denoted, for example, by a double circle about the piece placing the king in that position, or by using other suitable indicia.

With reference now to FIG. 1, the entire Byrnes v. Fisher game played in New York in 1956 is shown by the apparatus of the present invention. The pieces as originally arranged are not shown since they are always aligned in the same way. In this embodiment, the white pieces are represented by a plain circle 1, while the black are represented by a circle with a whole or partial line through the center, 2. Each such indicia has imprinted thereon a single letter to identify the piece and, if moved, a number to identify in what sequence the piece was moved. Also associated with the indicia of the pieces moved is a denotation of the track the piece followed, as, for example, 3, which shows that on black's second move, a pawn was moved to the third rank, or square, from the second rank in the king knight's file. The identity of the piece as a pawn is made both by the P denotation on the indicia representing the piece, and by the configuration of the track line, which is distinctive of the piece. Reference to all other track lines in FIG. 1 indicates their distinctiveness with respect to the pieces with which they are associated. From this apparatus, it is clear that white, which always moves first, moved one of his knights to the third rank in the king's bishop file. Black's first move was identical to white's. White's second move was to move a pawn in the queen's bishop file from the second to the fourth rank; etc. The first capture of the game is shown in white's fourth rank in his queen's bishop file where black captures a white pawn on its sixth move. This is shown by the indicia representing black's pawn overlapping the indicia representing white's pawn. On the next move, black's pawn was captured by white's queen. A denotation of "check" is shown by the circle 4 surrounding the indicia of a black rook in the first rank of the black king file (black move 16). A "discovered" check, that is, when a king is placed in danger of capture by a piece other than the one moved, is shown by the irregular circle 5 about the bishop in the fourth rank of white's queen's bishop file. Check mate is shown on the forty-first move by a double circle 6 around black's rook on its queen's bishop seventh rank.

It is evident that the entire game may be perceived without external notation using the apparatus of the present invention. Pieces are not removed from the apparatus when captured, as in an actual game, which enables the viewer to concisely appreciate the entire game, or segment depicted, without interrupting his gaze and concentration. While in FIG. 1, opening, middle and end games have not been depicted, they could be easily shown, if the operator so desires, by a change in color, hue, size, etc., of the indicia representing individual pieces.

Figure 2:
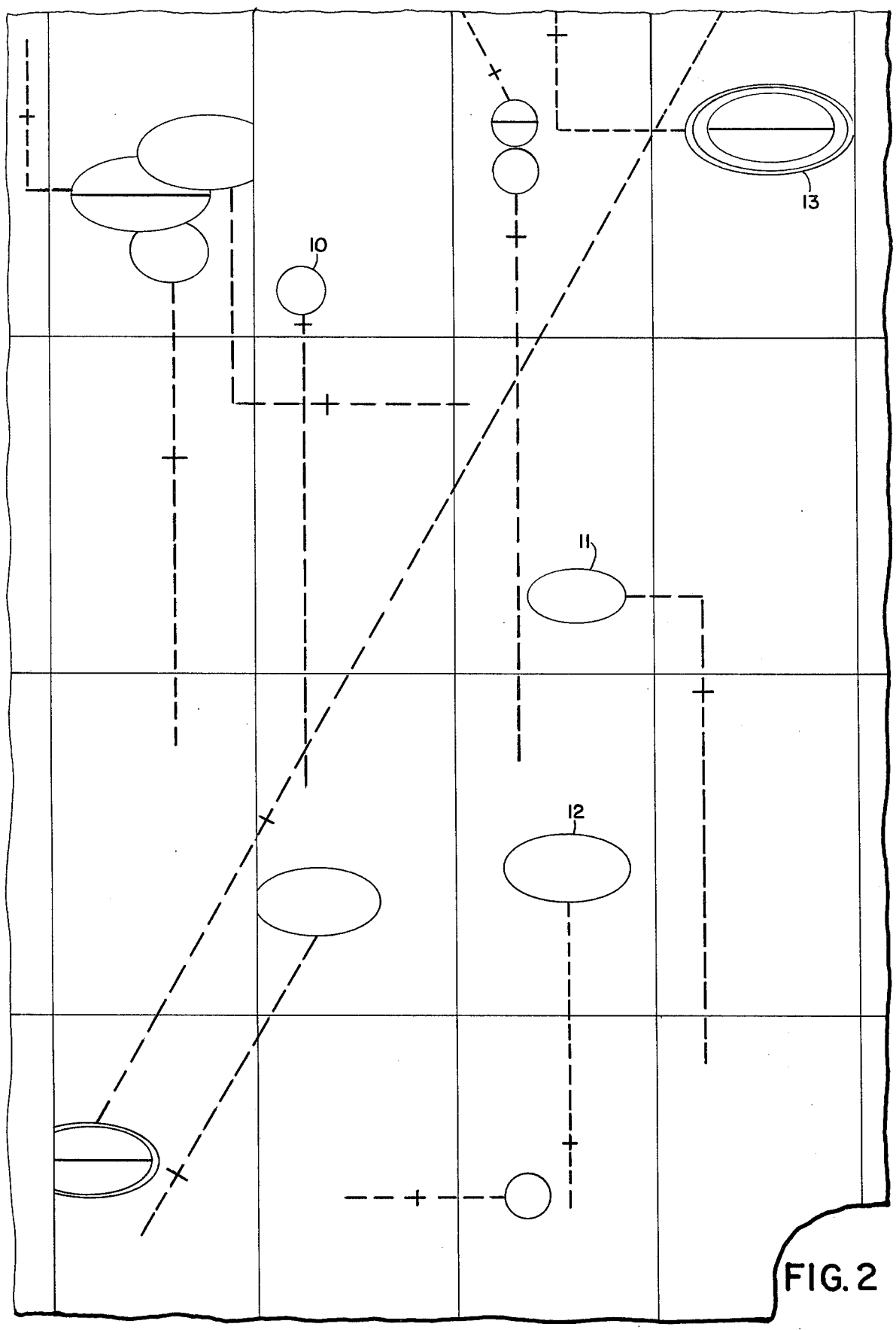
FIG. 2 is another embodiment of the present invention and teaches a portion of the Morphy v. Maurian chess game played in the Spring Hill Tournament of 1855.

FIG. 2 is an alternative embodiment without alphabetical or digital indicia and shows a portion of the Morphy v. Maurian game played at the Spring Hill Tournament of 1855. The sequence (number) of each move is denoted by a slash appropriately placed across a track line and the identity of the piece is obvious from the track line and from the piece's original position. This can also be shown by a change in color, hue, etc. as by configuring the track line with a series of dots, one of which is colored differently from the others. Opening, middle and end game moves are denoted by showing the opening moves as circles 10, the middle game moves as small elipses 11, and the end game moves as large elipses 12. Note that on move seven a white pawn is moved to Q4. It is captured by black's knight on move nine, which in turn is captured by white's knight on move ten. Check mate is shown by the double circles 13 about black's knight in move twelve.

Figure 3:
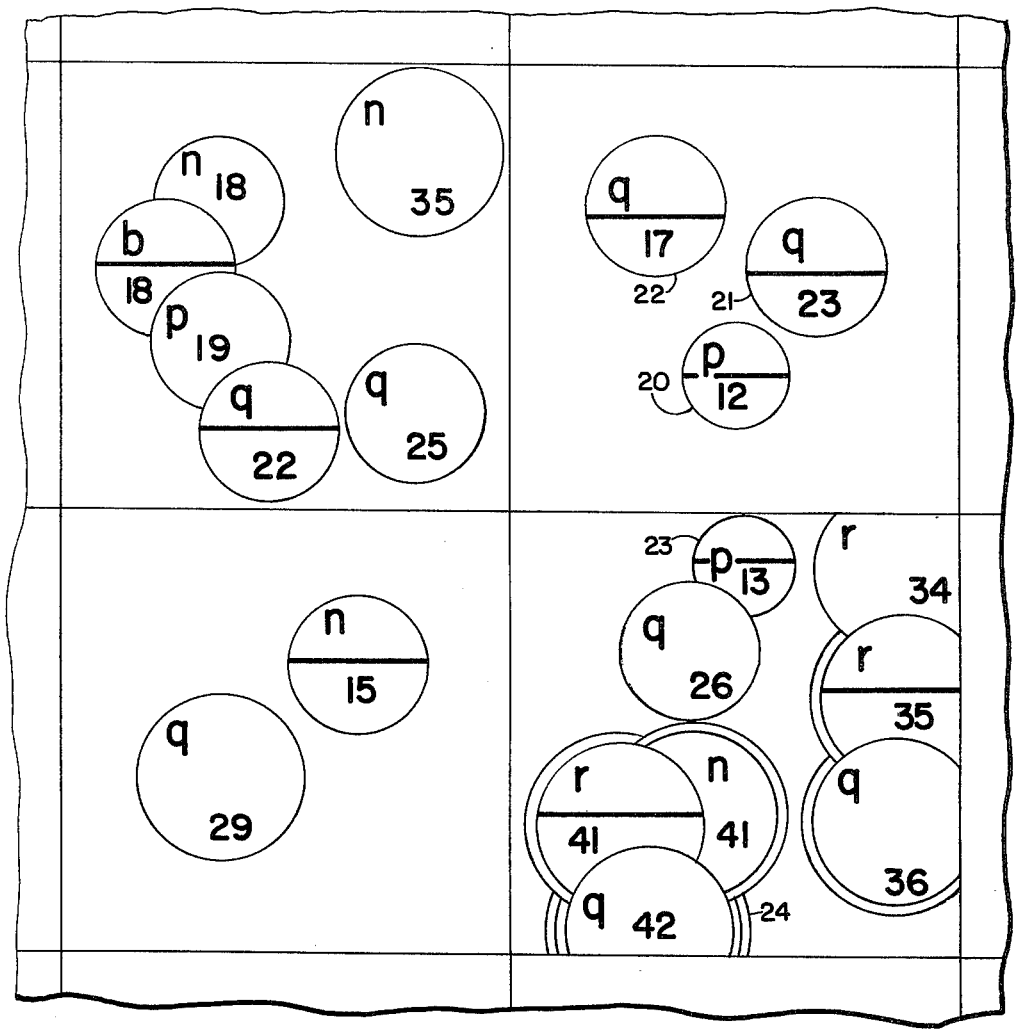
FIG. 3 is still another embodiment of the present invention and teaches a portion of the Korchnoi v. Meckin game played on Feb. 13, 1974.

FIG. 3 shows still another embodiment with alphabetical and digital denotations of respective pieces and moves from the Korchnoi v. Meckin game played on Feb. 13, 1974, with no track lines used. Like other embodiments, captures, checks, etc. are clearly shown. Also opening, middle and end games are shown by smaller 20, medium 21 and large 22 circles, respectively. It is clear that black advanced its pawn 23 on the thirteenth move and it was captured on white's twenty-sixth move by the queen. Track of movement is evident. Check mate is shown by the double circles 24 on the forty-second move where the white queen captured the black rook (shown by overlapping circles).

Since certain changes may be made in the above apparatus without departing from the scope of the invention herein described, it is intended that all matter contained in the above description or shown in the accompanying drawings shall be interpreted as illustrative and not in a limiting sense.

What is claimed is:

1. Educational and display apparatus for concisely depicting a sequence of events involving multiple entities which comprises:

a. a stratum comprising an enclosed area which represents the surface on which said sequence of events takes place;
b. first indicia associated with said stratum, said first indicia representing said multiple entities and arranged spacially within said enclosed area, said spacial arrangement being representative of the present and past spacial arrangement of said multiple entities with respect to one another; and
c. second indicia associated with said first indicia within said enclosed area which depict:
  1. the events which each of said entities experienced;
  2. the sequence in which said events were experienced; and
  3. the interactions between said entities whereby a visual representation is provided, without reference to indicia outside said enclosed area, of the events and sequence of events experienced by said entities and the resultant interactions between said entities.

2. The invention of claim 1 wherein said stratum is substantially planar.

3. The invention of claim 2 wherein said second indicia comprise alphabetical and digital indicia.

4. The invention of claim 2 wherein said second second indicia define the courses travelled by said entities during movement.

5. The invention of claim 1 wherein said sequence of events comprises a game of skill.

6. Educational and display apparatus for concisely depicting the moves comprising a game of chess, which comprises:

a. a stratum comprising an enclosed area which represents the surface on which the game of chess is played;
b. first indicia associated with said stratum, said first indicia representing the pieces used in a game of chess and arranged spacially within said enclosed area, said spacial arrangement being representative of the present and past special arrangement of said chess pieces with respect to one another; and
c. second indicia associated with said first indicia within said enclosed area which depict:
  1. movements of the pieces represented by said first indicia;
  2. the sequence in whch said movements occurred; and
  3. the interactions between said chess pieces; whereby a visual representation is provided, without reference to indicia outside said enclosed area, of the moves, and sequence of moves made, and the resultant interactions between the pieces.

7. The invention of claim 6 wherein said stratum is substantially planar.

8. The invention of claim 7 wherein said second indicia comprise alphabetical and digital indicia.

9. The invention of claim 7 wherein said second indicia define the courses travelled by the chess pieces during movement.

10. The invention of claim 7 wherein overlapping first indicia define the capture of the piece represented by the overlapped first indicia by the piece represented by the overlapping first indicia.

* * * * *